(12) United States Patent
Chiang

(10) Patent No.: US 7,252,495 B2
(45) Date of Patent: Aug. 7, 2007

(54) PRESS-MOLDING MOLD

(75) Inventor: Tsung-Wei Chiang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/434,377

(22) Filed: May 15, 2006

(65) Prior Publication Data

US 2006/0280831 A1 Dec. 14, 2006

(30) Foreign Application Priority Data

Jun. 8, 2005 (CN) .......................... 200510035224

(51) Int. Cl.
B29D 11/00 (2006.01)
C03B 11/08 (2006.01)

(52) U.S. Cl. ..................... 425/195; 425/352; 425/353; 425/808; 425/451.9; 65/305

(58) Field of Classification Search ............... 425/353, 425/402, 408, 808, 395, 127, 384, 451.9, 425/195, 352; 264/325, 1.38, 2.2; 65/305, 65/29.12
See application file for complete search history.

(56) References Cited

U.S. PATENT DOCUMENTS

| | | | |
|---|---|---|---|
| 1,567,766 A * | 12/1925 | Stacy | 425/406 |
| 2,333,131 A * | 11/1943 | Hasenzahl et al. | 264/325 |
| 4,786,444 A * | 11/1988 | Hwang | 264/1.38 |
| 5,202,156 A | 4/1993 | Yamamoto et al. | |
| 5,211,969 A * | 5/1993 | Yoshimura | 425/395 |
| 5,326,244 A * | 7/1994 | Ridgill et al. | 425/127 |
| 5,662,951 A * | 9/1997 | Greshes | 425/384 |
| 5,776,381 A * | 7/1998 | Haase | 264/2.2 |
| 5,938,807 A * | 8/1999 | Komiyama et al. | 65/29.12 |
| 6,652,260 B2 * | 11/2003 | Nelson et al. | 425/398 |
| 7,065,985 B2 * | 6/2006 | Yamanaka | 65/305 |
| 2004/0096536 A1* | 5/2004 | Meissner | 425/195 |

* cited by examiner

Primary Examiner—Robert Davis
Assistant Examiner—Dimple Bodawala
(74) Attorney, Agent, or Firm—Jeffrey T. Knapp

(57) ABSTRACT

A press-molding mold includes a first mold part (10), a second mold part (20), a bushing (40), a first latching pin (50) and a second latching pin (70). The second mold part (20) defines a longitudinal central axis (21) and includes a first positioning portion (211) having an annular groove (212) defined in an outer surface thereof and a plurality of first longitudinal holes (213) defined therein. The bushing (40) includes a second positioning portion (430) defining a second longitudinal through hole (432) configured for alignment with one of the first longitudinal holes (213) and a transverse through hole (434) spatially corresponding to the annular groove (212). The first latching pin (50) latchingly extends through the transverse through hole (434) and insertion into the annular groove (212). The second latching pin (70) latchingly extends through the second longitudinal hole (432) and insertion in one of the first longitudinal hole (213).

8 Claims, 3 Drawing Sheets

PRESS-MOLDING MOLD

TECHNICAL FIELD

The present invention relates to molds, and particularly to a press-molding mold for manufacturing optical articles with high concentricity.

BACKGROUND

Molds are widely used for manufacturing optical articles, such as light guide plates, lenses, and so on. A conventional press-molding mold includes a first mold part, a second mold part, and a bushing for receiving the first mold part and the second mold part therein. Generally, the first mold part includes a first molding surface. The second mold part includes a second molding surface spatially corresponding to the first molding surface.

In a glass lens molding process, the second mold part is inserted into the bushing, and then a glass preform is placed on the second molding surface of the second mold part. The first mold part is then inserted into the bushing to press (i.e. force the glass to a certain shape) the glass preform, thereby obtaining a predetermined glass lens.

However, during design or assembly discrepancies may occur between the position of the first mold part and the position of the second mold part, producing corresponding discrepancies in the finished article.

Therefore, a press-molding mold that overcomes the above-described problems is desired.

SUMMARY

A press-molding mold includes a first mold part, a second mold part, a bushing, a first latching pin, and a second latching pin. The second mold part is configured to be mated with the first mold part. The second mold part defines a longitudinal central axis and includes a first positioning portion. The first positioning portion has an annular groove defined in an outer surface thereof and a plurality of first longitudinal holes defined therein. The bushing is configured to receive the first mold part and the second mold part therein. The bushing includes a second positioning portion spatially corresponding to the first positioning portion. The second positioning portion has a second longitudinal through hole configured for alignment with respect to one of the first longitudinal holes and a transverse through hole spatially corresponding to the annular groove. The first latching pin is configured for latchingly extending through the transverse through hole and insertion into the annular groove. The second latching pin is configured for latchingly extending through the second longitudinal hole and insertion into one of the first longitudinal holes.

Advantages and novel features will become more apparent from the following detailed description when taken in conjunction with the accompanying drawing.

BRIEF DESCRIPTION OF THE DRAWINGS

Many aspects of the present press-molding mold can be better understood with reference to the following drawings. The components in the drawings are not necessarily drawn to scale, the emphasis instead being placed upon clearly illustrating the principles of the present press-molding mold. Moreover, in the drawings, like reference numerals designate corresponding parts throughout the several views.

DETAILED DESCRIPTION OF THE PREFERRED EMBODIMENT

Figure 1:
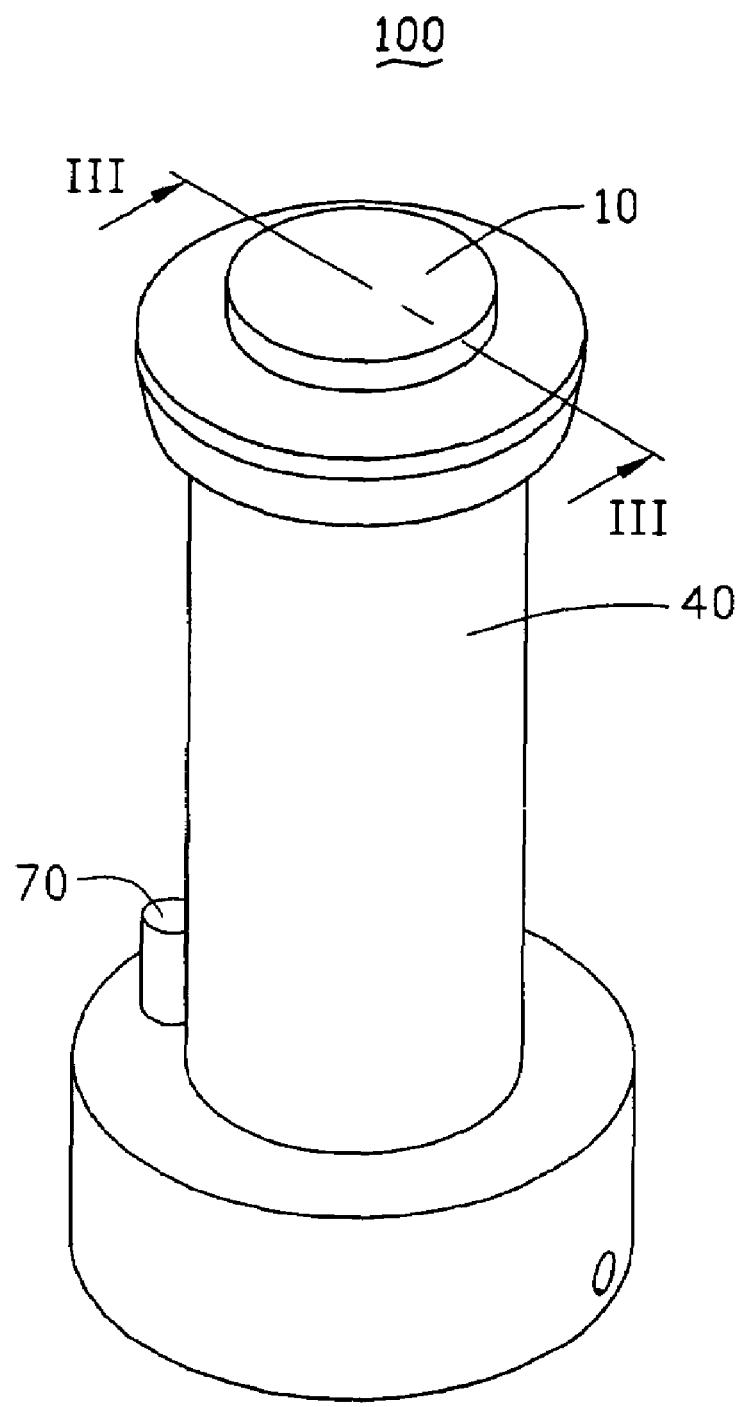
FIG. 1 is a schematic, isometric view of a press-molding mold in accordance with an exemplary embodiment.
Figure 2:
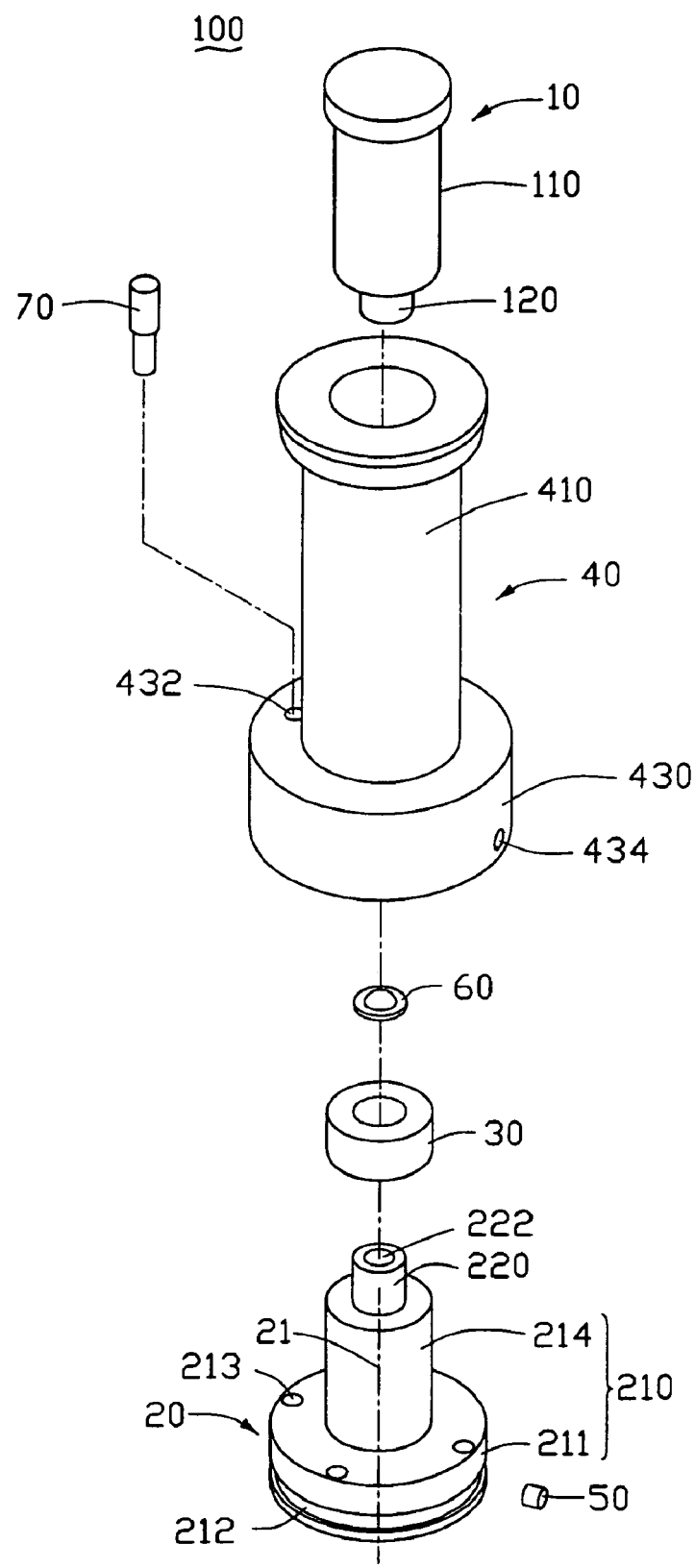
FIG. 2 is a schematic, isometric exploded view of FIG. 1.

Referring to FIGS. 1 and 2, a press-molding mold 100 for manufacturing optical articles, for example, optical lenses in accordance with a preferred embodiment is shown. The press-molding mold 100 includes a first mold part 10, a second mold part 20, a positioning element 30 and a bushing 40 for receiving the first mold part 10, the second mold part 20, and the positioning element 30 therein. The first mold part 10, the second mold part 20 are coaxially arranged in the bushing 40.

Figure 3:
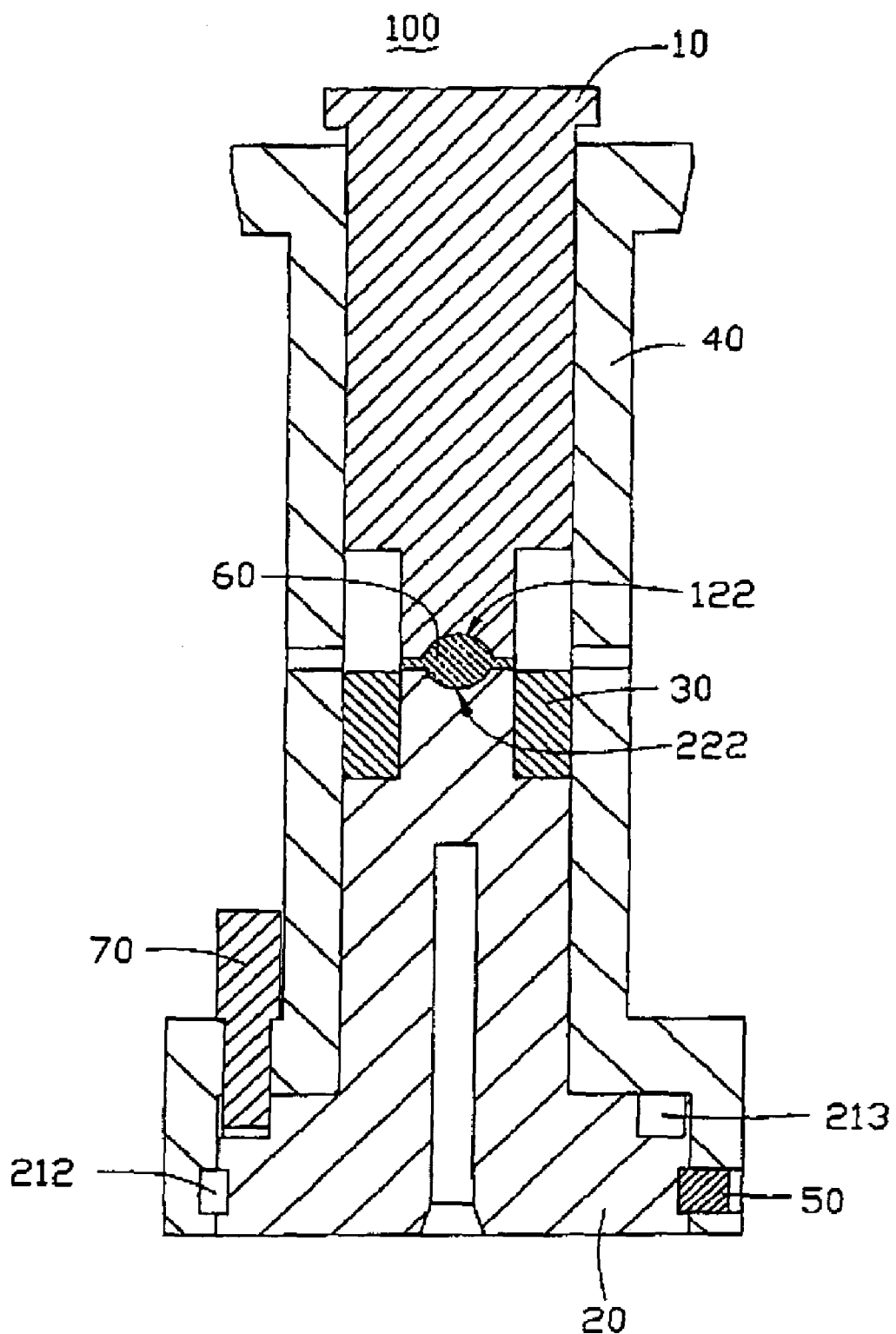
FIG. 3 is a schematic, cross-sectional view along line III-III of FIG. 1.

Referring to FIG. 2, the first mold part 10 includes a first main body 110 and a first molding portion 120 extending from the first main body 110. The first molding portion 120 defines a first molding surface 122, as shown in FIG. 3. Referring to FIGS. 2 and 3, the second mold part 20 includes a second main body 210 and a second molding portion 220 extending from the second main body 210. The second molding portion 220 is configured to be mated with the first molding portion 120. The second molding portion 220 defines a longitudinal central axis 21 and includes a second molding surface 222 spatially corresponding to the first molding surface 122. The second main body 210 includes a first positioning portion 211 and a connecting stage 214 for connecting the first positioning portion 211 with the second molding portion 220. Preferably, the second molding portion 220, the connecting portion 214 and the first positioning portion 211 are coaxially joined together, i.e., they share the longitudinal central axis 21.

Referring to FIG. 2, the first positioning portion 211 is cylinder-shaped. In addition, the first positioning portion 211 defines an annular groove 212 round an outer surface thereof, and a number of first longitudinal holes 213 in a direction parallel with the longitudinal central axis 21. The annular groove 212 is configured for receiving a first latching pin 50 to fix the second mold part 20 to the bushing 40 for preventing the second mold 20 from moving along the longitudinal axial direction with respect to the bushing 40. The annular groove 212 is defined by a bottom surface and two side surfaces adjacent to and perpendicularly extending from the bottom surface. Advantageously, a width (a distance between the two side surfaces) of the annular groove 212 should be equal to a width of the first latching pin 50, and a length of the portion of the first latching pin 50 that is inserted in the annular groove 212 may be equal to or less than a depth of the annular groove 212. Thus, the second mold part 20 can be prevented from moving along the direction of the longitudinal central axis 21, while the second mold part 20 can be rotated around the longitudinal central axis 21. The first positioning portion 211 includes a first plane, and the first longitudinal holes 213 arc defined in the flat surface. Preferably, each first longitudinal hole 213 is equidistant from the longitudinal central axis 21. The first longitudinal boles 213 may be a blind hole or a trough hole, for receiving a second latching pin 70 to fix the second mold part 20 with the bushing 40 for preventing the second mold part 20 from moving along a radial direction relative to the bushing 40. Therefore, in both the radial direction and the longitudinal axial direction, the second mold part 20 is fixed within the bushing 40.

Referring to FIG. 2, the positioning element 30 is annular-shaped, and when matched with the second molding portion 220 can surround the second molding portion 220. The bushing 40 may be cylinder-shaped, and includes a main body 410 and a second positioning portion 430 for receiving the first positioning portion 211 therein. A transverse through hole 434 is defined in the second positioning portion 430 for receiving the first latching pin 50 to fix the second mold pan 20 with the bushing 40. Thus, the second mold part 20 is prevented from moving along the direction of the longitudinal central axis 21. A second longitudinal through hole 432 is defined in the second positioning portion 430 for receiving the second latching pin 70 to fix the second mold part 20 with the bushing 40 for preventing the second mold part 20 from moving along a radial direction relative to the bushing 40. Preferably, a distance between the second longitudinal through hole 432 and the longitudinal central axis 21 is equal to each of the distances between the first longitudinal holes 213 and the longitudinal central axis 21.

An optical article such as a glass lens may be manufactured by the press-molding mold 100 by following process. Firstly, the second mold parr 20 is inserted into the bushing 40 from the second positioning portion 430. thereby the first positioning portion 21 lean be combined with the second position portion 430. Secondly, the first latching pin 50 is inserted into the annular groove 212 trough the transverse through hole 434, thus allowing the second mold part 20 to rotate around the longitudinal central axis 21. Thirdly, the positioning element 30 is coiled around the second molding portion 220 and a glass preform is placed on the second molding surface 222 of the molding portion 220. Fourthly, the first molding portion 120 is inserted into the bushing 40, and the second mold part 20 is rotated to adjust the second longitudinal through hole 432 so as to aim at one of the first longitudinal holes 213, then fixing the second mold part 20 and the bushing 40 by inserting the second latching pin 70 through one of the first longitudinal holes 413 and then through the second longitudinal through hole 213. Fifthly, adjusting the discrepancy between an axis of the first molding portion 120 and an axis of the second molding portion 220 ensures that the axis of the first molding portion 120 and that of the second molding portion 220 are substantially collinear. Then, putting pressure on the first molding portion 120 presses the glass preform, thereby obtaining a desired glass lens 60.

In the fifth step, if the measured discrepancy is too large, the second mold part 20 will be continuously rotated in a manner such that the second longitudinal through hole 432 may aim at another first longitudinal hole 213, then the discrepancy is measured again and the process is repeated until the discrepancy is small enough to suit requirements, that is to say, when the axis of the first molding portion 120 and that of the second molding portion 220 are substantially collinear. Therefore, in the process of pressing the glass preform, the first molding portion 120 and the second molding portion 220 can obtain a low discrepancy between the positions of the first molding portion 120 and the second molding portion 220 giving a high concentricity to the final product.

The obtained glass lens has a first surface and a second surface. The first surface of the glass lens is formed by the first molding surface 122 of the first mold part 10, and the second surface of the glass lens is formed by the second molding surface 222 of the second mold part 20. Because of the high concentricity between the first molding portion 120 and the second molding portion 220, the press-molding mold 100 can also make a lot of glass lenses with high concentricity.

In the present press-molding mold 100, the second mold part 20 is configured capable of rotating, thus an eccentricity between the second molding portion 220 of the second mold part 20 and the first molding portion 120 of the first mold part 10 can be adjusted. Therefore, in a condition of the satisfying eccentricity of the press-molding mold 100, excellent quality optical articles with low eccentricity or high concentricity can be manufactured.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A press-molding mold comprising:
    a first mold part;
    a second mold part configured to be mated with the first mold part, the second mold part defining a longitudinal central axis and comprising a first positioning portion, the first positioning portion having an annular groove defined in an outer surface thereof and a plurality of first longitudinal holes defined therein;
    a bushing configured for receiving the first mold part and the second mold part therein, the bushing comprising a second positioning portion spatially corresponding to the first positioning portion, the second positioning portion having a second longitudinal through hole configured for alignment with one of the first longitudinal holes and a transverse through hole spatially corresponding to the annular groove;
    a first latching pin configured for latchingly extending through the transverse through hole and insertion in the annular groove; and
    a second latching pin configured for latchingly extending through the second longitudinal hole and insertion in one of the first longitudinal hole.

2. The press-molding mold as described in claim 1, wherein the first mold part, the second mold part are coaxially arranged in the bushing.

3. The press-molding mold as described in claim 1, wherein each of the first longitudinal holes is one of a blind hole and a through hole.

4. The press-molding mold as described in claim 1, wherein the first position portion of the second mold part has a flat surface, and the first longitudinal holes are defined in the flat surface.

5. The press-molding mold as described in claim 4, wherein the first longitudinal holes are equidistant from the longitudinal central axis of the second mold part.

6. The press-molding mold as described in claim 5, wherein a distance between the second longitudinal hole and the longitudinal central axis of the second mold part is equal to a distance between each of the first longitudinal holes and the longitudinal central axis of the second mold part.

7. The press-molding mold as described in claim 1, wherein a width of the annular groove is equal to a width of the first latching pin.

8. The press-molding mold as described in claim 7, wherein a length of a portion of the first latching pin that is received within the annular groove is less than a depth of the annular groove.

* * * * *